Figure 5:
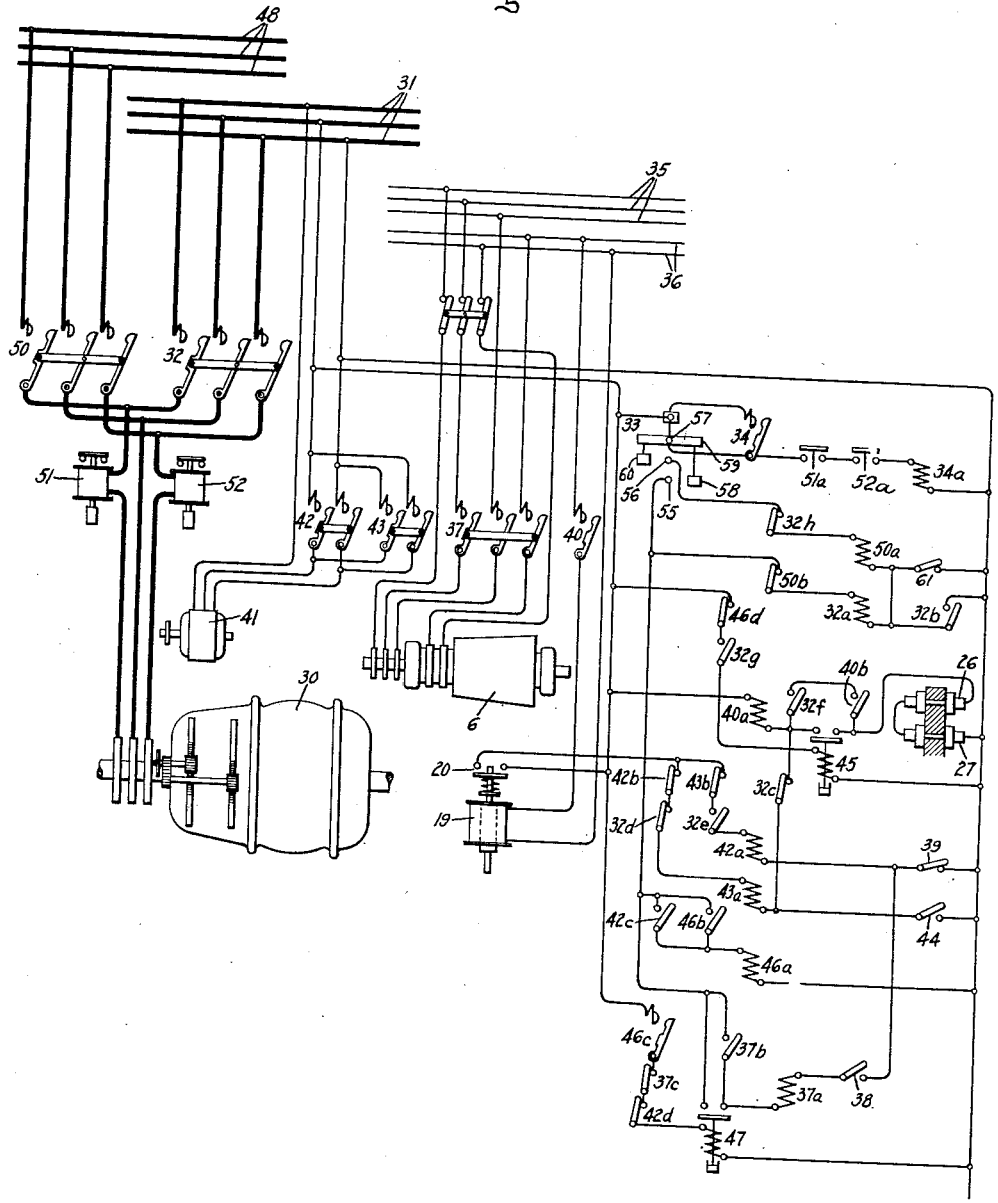

Jan. 15, 1929.
R. D. GIVEN ET AL
1,699,106
SYSTEM OF MOTOR CONTROL
Filed April 12, 1927　　2 Sheets-Sheet 1
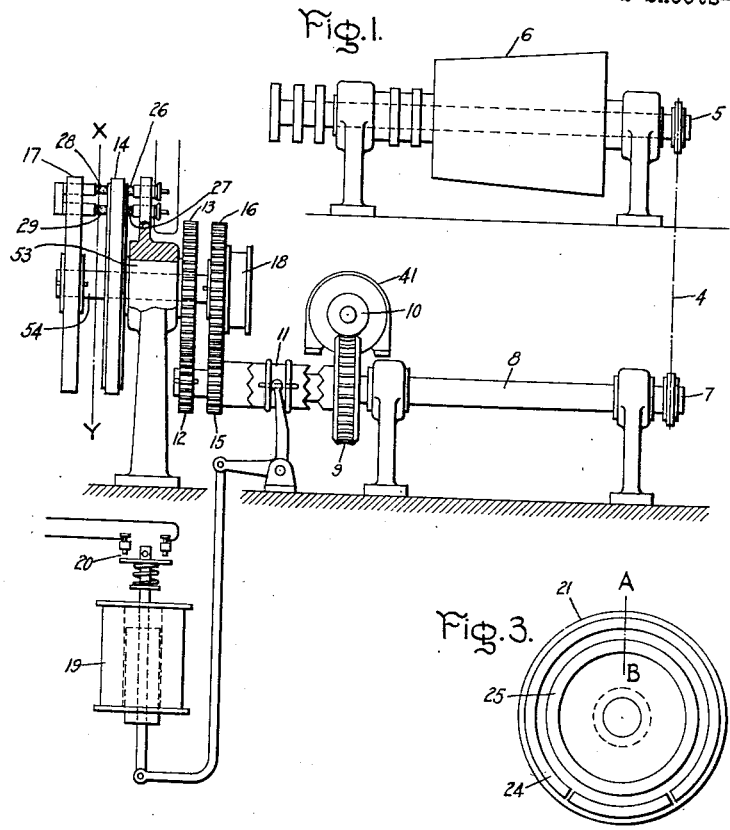
Inventors:
Ralph D. Given,
William J. Pool,
by
Their Attorney.

Inventors:
Ralph D. Given,
William J. Pool,
by
Their Attorney.

Patented Jan. 15, 1929.

1,699,106

UNITED STATES PATENT OFFICE.

RALPH D. GIVEN, OF LEAMINGTON, AND WILLIAM J. POOL, OF RUGBY, ENGLAND, ASSIGNORS TO GENERAL ELECTRIC COMPANY, A CORPORATION OF NEW YORK.

SYSTEM OF MOTOR CONTROL.

Application filed April 12, 1927, Serial No. 183,172, and in Great Britain June 23, 1926.

In control systems for maintaining constant the relation between the speeds of a number of electric motors driving separate sections of a machine, such, for example, as described in British Patent No. 205,215 in connection with paper making machines, it is desirable, when any motor is brought into action, that its speed should be brought to approximately the correct value before the speed controlling mechanism is connected to the control or master alternator; otherwise, excessively rapid acceleration or deceleration of the motor may occur, causing it to be overloaded. It is also desirable that when the motor driving the master alternator is started, it should run at the same speed as it ran on the last occasion, so that the paper speed, for example, in the case of motors driving a paper machine, shall always be the same unless intentionally altered.

These conditions are satisfied by arranging that, after the whole of the motors driving sections of a given machine have been running with their speed relations fixed by their speed controlling mechanisms, if any or all of the motors are stopped they shall, when started again, run at approximately the speeds at which they were running before stopping. Their speed relations will thus be approximately as determined previously by their speed controlling mechanisms, and the latter can therefore be brought into operation without difficulty.

In applications where the motors are of the brush-shifting alternating current commutator type, the speed of which is varied by moving the brushes, the motors have hitherto been started up by means of resistance introduced into their secondary circuits, and short-circuited in steps by means of magnetically operated contactor switches, the brushes remaining in the same position during the operation of stopping and starting, so that the speed when all secondary resistance has been short-circuited is approximately the same as before the motor was stopped. Provision has also been made so that secondary resistance can be introduced at will, in order to obtain creeping speeds, when it is required for purposes of inspection, cleaning and clothing, in the case of a paper machine.

It is, however, well known that motors of the type above referred to can be started satisfactorily by connecting their primary windings to the supply lines without the use of secondary resistances, provided the brushes are first moved to the minimum speed position. The speed may then be increased to any desired value, within the capacity of the motor, by moving the brushes to the appropriate position.

The present invention relates to a method and apparatus whereby the brushes are moved automatically to the minimum speed position whenever the motor is stopped, and are returned automatically to the position they occupied previous to the stopping of the motor, whenever the motor is restarted. It also provides an alternative method of obtaining creeping speeds. Secondary resistances and contactor switches, and the cables connecting them to the motors are thus eliminated.

It should be understood that it is not essential that all the motors driving sections of a single machine should be started up in the manner now to be described; some may be started by this method, and others by the method employing secondary resistance.

The accompanying diagrams illustrate one method of carrying the invention into effect. These diagrams show the apparatus required for one motor; similar apparatus is necessary for each motor to be controlled by the method described.

Fig. 1 shows the additional apparatus, other than switchgear, required for each motor. Fig. 2 shows the connection between this apparatus and the speed controlling apparatus described in British Patent No. 205,215; Fig. 3 gives a clearer view of a part of the apparatus shown in Fig. 1, and Fig. 4 is an enlarged view of part of Fig. 3. Fig. 5 shows a proposed arrangement of the electrical connections and switch gear.

Referring to Figs. 1 and 2, the spindle 1 on the alternating current commutator motor, by the rotation of which the position of the brushes is changed, is rotated through spur gearing by means of the spindle 2, which is connected through the sprocket 3, chain 4 and sprocket 5 to the speed regulating device 6, which operates to maintain the speed of the commutator motor constant as described in said British Patent No. 205,215. The chain also passes around sprocket 7 keyed to shaft 8, which carries loose on it a worm wheel 9 meshing with a worm 10 driven in either direction by a small pilot motor 41. A clutch member 11, sliding on a feather on the shaft 8, can be caused to engage with suitable projections on the worm wheel 9, thus connecting the worm wheel to the shaft.

The brush gear of the commutator motor can therefore be moved either by the speed regulating motor 6, when the commutator motor is running at its normal speed, the clutch 11 being then disengaged from the worm-wheel, or by the pilot motor 41 through worm 10, when it is desired to stop or start the commutator motor, the clutch member 11 being then engaged with the worm-wheel, and the speed regulating motor being disconnected from the master alternator.

Shaft 8 also has keyed to it pinion 12, engaging with spur wheel 13, which drives disc 14 through a hollow shaft 53. Shaft 8 also has loose on it pinion 15 driving spur wheel 16, which drives disc 17 through a shaft 54 passing through the hollow shaft 53. Pinion 15 is adapted to engage with clutch member 11, when the latter is disengaged from worm wheel 9. A brake acting on brake-drum 18, attached to spur-wheel 16, prevents the latter from rotating when the clutch is disengaged.

A solenoid 19 is so connected to the sliding clutch member 11 that the latter is held in engagement with the pinion 15 by means of a weight or spring, so long as the solenoid is not excited, but when the solenoid is excited the clutch member 11 is disengaged from pinion 15 and engaged with worm-wheel 9. The solenoid is provided with contacts 20 which complete an electrical circuit when the solenoid is energized, provision being made to ensure that the circuit is completed without fail even though the clutch should be prevented from engaging at once by the projections of the sliding member encountering those on the worm-wheel.

Referring now to Figs. 3 and 4, which illustrate the construction and operation of discs 14 and 17, disc 14 consists of a disc of insulating material 21, on one side of which are mounted two complete metal rings 22 and 23, and on the other side are two further metal rings, one, 25, being complete, and the other, 24, having a section separated from the remainder by two sawcuts. Ring 23 is connected electrically to ring 25, and ring 22 is connected electrically to the main section of ring 24, the separated section of which is, however, insulated from it. Two brushes 26 and 27, fixed in space, bear on rings 22 and 23, and two further brushes 28 and 29, carried by disc 17, bear on rings 24 and 25. Brushes 28 and 29 are connected together electrically and are insulated from disc 17. It will be seen that an electrical circuit exists between brushes 26 and 27, through ring 22, ring 24, brush 28, brush 29, ring 25, and ring 23, except when brush 28 is bearing on the insulated section of ring 24. It will further be seen that the position of disc 14 at which the circuit is interrupted depends on the position of disc 17.

The method of operation of the apparatus will now be described, reference being made to Fig. 5, which shows the various contactor switches, relays, etc., in the positions occupied when power is cut off, interlock switches, contacts and magnets bearing the same number forming part of the same contactor switch. Consider first the condition when the alternating current commutator motor 30 is running, its speed being controlled by the speed regulating device 6. The primary of the motor is connected to the supply lines 31 through the contactor switch 32, which is held closed by its operating magnet 32$^a$, the circuit for which is completed through interlocks 32$^b$ and 50$^b$, no-volt contactor 34, and master controller 33, which for this condition is in the "run" position, i. e. contacts 55 and 57 are bridged by segments 58 and 59. The speed regulating device has its armature member connected to the alternating current bus bars 35, supplied from the master alternator, and its field member connected to the direct current bus-bars 36 through the contactor switch 37, whose operating magnet 37$^a$ is energized through interlock 37$^b$, limit switches 38 and 39, on the commutator motor brushgear, and master controller 33. Solenoid 19 is deenergized, the contactor switch 40 through which it is supplied being open, and pilot motor 41 is at rest, the contactor switches 42 and 43 being open.

Referring now to Fig. 1, the clutch member 11 is held to the left by a weight or spring, so that it engages with pinion 15. Worm-wheel 9 is free on shaft 8, but both pinions 12 and 15 will turn with shaft 8. Consider that the relative positions of discs 14 and 17 are such that brush 28 is just breaking contact with the main or live portion of ring 24. Any movement of the commutator motor brushgear due to the operation of the speed regulating device will cause a simultaneous movement of discs 14 and 17, the relative positions of the two discs remaining unchanged, but the position in space being dependent on the position of the brushgear.

Suppose now the master controller 33 is moved to the "off" position, thus interrupting the circuit between contacts 55 and 57. Operating magnet 32$^a$ is deenergized, opening contactor switch 32, disconnecting the commutator motor from the line and causing it to slow down and stop. Operating magnet 37ᵃ is simultaneously deenergized, opening contactor switch 37, disconnecting the speed regulating device 6 from the speed control busbars 35 and 36.

An interlock switch 32ᶜ is closed by contactor switch 32 when the latter opens, completing the circuit of the operating magnet 40ᵃ of contactor switch 40, through brushgear limit switch 44. Contactor switch 40 closes, causing the solenoid 19 to be energized and to move clutch member 11 (Fig. 1) to the right, disengaging it from pinion 15 and engaging or attempting to engage it with worm-wheel 9. Contacts 20 on the solenoid complete the circuit of the operating magnet 43ᵃ of contactor switch 43 through interlocks 32ᵈ and 42ᵇ. Contactor switch 43 closes, connecting pilot motor 41 to the supply lines. Pilot motor 41, now rotates worm wheel 9 through worm 10, clutch 11 slipping into engagement with the worm wheel if it has not already engaged, causing shaft 8 to rotate and move the commutator motor brushgear as already explained. The direction of rotation of the pilot motor is such as to move the brushgear in the direction for lowering the speed of the commutator motor.

During this process it should be noted that disc 14 moves a distance proportional to the movement of the brushgear, whilst disc 17 remains stationary, being held in position by the brake acting on brake drum 18. Brush 28 makes contact with the main section of ring 24, but the circuit through this is kept open by interlock 32ᶠ and relay contacts 45. When the commutator motor brushgear has reached the position corresponding to the minimum speed, it opens limit switch 44, causing contactor switch 43 to be opened, stopping the pilot motor, and also opens contactor switch 40, deenergizing the solenoid.

Consider now the master controller again moved to the "run" position. Operating magnet 32ᵃ is energized through interlock 50ᵇ, and brushgear interlock switch 61, which is closed when the brushgear is in the minimum speed position. Contactor switch 32 closes, connecting commutator motor primary to supply lines, and commutator motor starts and accelerates to its minimum running speed. Contactor switch 32 closes interlock 32ᵇ, short-circuiting the interlock switch 61, and 32ᵍ, which energizes the operating coil of time delay relay 45. Contactor switch 32 also closes interlock 32ᶜ. Relay 45, after a predetermined interval of time, sufficient to allow the motor to reach its minimum running speed, closes its contacts and completes the circuit of operating magnet 40ᵃ, through brushes 26 and 27, rings and brushes carried on discs 14 and 17, as already described.

Contactor switch 40 closes, energizing solenoid 19, which disengages clutch 11 from pinion 15 and engages it with worm-wheel 9 as previously described. Contacts 20 on solenoid 19 close and complete the circuit of operating magnet 42ᵃ through interlocks 43ᵇ, 32ᵉ, and brushgear limit switch 39. Contactor switch 42 closes, and pilot motor 41 runs, moving commutator motor brush-gear through worm 10, worm-wheel 9, and shaft 8 in the direction to increase the speed. During this operation disc 17 remains stationary, being held by the brake, and disc 14 moves with the brushgear. An interlock 40ᵇ on contactor switch 40, with the interlock 32ᶠ on contactor switch 32, short-circuits the contacts of relay 45. Interlock 42ᶜ closes with contactor switch 42, and completes the circuit of relay 46ᵃ, one contact of which 46ᵇ now short circuits interlock 42ᶜ, and another contact 46ᵈ opens the circuit of relay 45, causing its contacts to open.

The pilot motor continues to move the brushgear and so increase the speed of the commutator motor until disc 14 has moved to the position where brush 28 breaks contact with the main section of ring 24, thus interrupting the circuit between brushes 26 and 27. The brush gear will now have reached the position it occupied before the motor was stopped, since one disc 17 has remained stationary since the motor was last running, and the other disc 14, which is permanently connected to the brush gear, has now been brought to the same position relative to disc 17 as before.

When the circuit between brushes 26 and 27 is interrupted the operating magnet 40ᵃ of contactor switch 40 is deenergized, 40 opening and deenergizing the solenoid 19. This allows the clutch member 11 to disengage from worm-wheel 9, and engage with the pinion 15. The deenergizing of the solenoid also opens contacts 20, causing contactor switch 42 to open and stop the pilot motor.

When contactor switch 42 opens, an interlock 42ᵈ on it completes through interlock 46ᶜ, the operating coil circuit of time delay relay 47. This relay, after a predetermined time interval sufficient to allow the commutator motor to complete its acceleration, closes its contacts and completes the circuit, through limit switches 38 and 39, of the operating magnet 37ᵃ of contactor switch 37 which closes, connecting the speed regulating device 6 to the alternating current and direct current speed control bus-bars 35 and 36.

Interlock 37ᵇ on contactor switch 37 short circuits the contacts of relay 47, and interlock 37ᶜ on 37 opens its operating coil circuit. Conditions are thus restored to those obtaining before the motor was stopped.

For obtaining a creeping speed, which may be of the order of one quarter of the minimum speed obtainable by movement of the brushes of the commutator motor, a supply of power at reduced frequency and voltage may be used. This power may be supplied to lines 48 from a separate alternator driven either by a prime mover or by an electric motor running on the main supply lines 31; or the power may be obtained from these supply lines through any known form of frequency changer.

The commutator motor primary may be connected to the low frequency supply lines through contactor switch 50, the operating magnet 50$^a$ of which is energized by moving the master controller 33 to the "creep" position (in which contacts 56 and 57 are bridged by segments 60 and 59) through interlock 32$^h$ and brushgear interlock switch 61.

If the low frequency supply is obtained from a motor driven alternator, arrangements may be made so that the latter is started automatically by any known method whenever the master controller associated with any motor is moved to the "creep" position, and is stopped when all the master controllers are moved to the "run" position. Moreover, a common source of low frequency, of whatever type, may be used to supply not only a number of motors driving sections of one machine but those driving sections of two or more machines. The capacity of the low frequency supply need not be great, since the number of motors connected to it at any one time will be limited.

Further, the relation between the voltage and frequency of the low frequency supply may be such as to give a modified characteristic to the commutator motor as compared with its characteristic when operating from the normal source of supply; for instance, by increasing the voltage, a higher starting torque can be obtained.

The objects of certain features shown in Fig. 5 will now be more fully explained.

Interlocks 32$^b$ and 50$^b$ on contactor switches 32 and 50 respectively, prevent the operating magnet of either contactor being energized whilst the other contactor switch is closed. Interlocks 42$^b$ and 43$^b$ perform a similar function with relation to contactor switches 42 and 43.

Interlock 40$^b$ on contactor switch 40 ensures that when the latter has been opened by the breaking of the circuit between brushes 26 and 27, it will not be reclosed by the accidental remaking of this circuit such as might occur through a slight relative movement of discs 14 and 17, when the teeth of the clutch engage.

Limit switches 38 and 39, connected to the brushgear of the commutator motor, are arranged to cut the speed regulating device 6 out of action should the brushgear approach the end of its travel through a misadjustment. Limit switch 39 also cuts off the pilot motor 41 should it cause the brushgear to approach too closely the top limit of its travel due to misadjustment of the contacts on discs 14 and 17.

It should be noted that limit switch 38 must always be set to operate at a slightly higher speed than limit switch 44, so that the operations described must always be performed in stopping and starting even if the brushgear has been moved by the speed regulating device to the lowest speed permitted by limit switch 38.

Overload relays 51 and 52 are connected in the supply to the commutator motor, arranged to open contacts 51$^a$ and 52$^a$ in the circuit of the operating magnet 34$^a$ of the no-volt contactor 34, thus cutting off the supply to the master controller. The no-volt contactor can only be reclosed after resetting the overload relays, by returning the master controller to the "off" position.

The general nature and one method of carrying out our invention have now been described. The invention is not, however, limited to the method described.

For example, the mechanical transmissions, such as the chain gear 4, the worm and worm-wheel 10 and 9, the spur wheels and pinions 13, 16, 12, 15, and the clutch 11, may be replaced by any well known mechanical arrangements producing the same results; the discs 14 and 17 with their brushes and rings may be replaced by any equivalent system of relatively movable contacts; and the electrical contactor switches, relays and connections may be replaced by others having the same effect.

In particular the contactor switches may have their operating magnets controlled by a master controller driven by the pilot motor 41. In this case the pilot motor with the master controller will be started up first when starting the commutator motor. The master controller will cause contactor switch 32 to close, connecting the commutator motor to the supply line. After a suitable time interval determined by the rate of rotation of the master controller, the latter will cause the solenoid 19 to operate the clutch 11, and the master controller and brushgear will then be moved simultaneously, until the disc contacts are broken, when the clutch solenoid is deenergized. The master controller will continue to run, and after a further interval it will cause contactor switch 43 to close, and the pilot motor to stop. A corresponding modification would be made to the operation of stopping the commutator motor.

Creeping speeds need not be obtained by the use of a low frequency supply as described, but may alternatively be obtained by the use of secondary resistances, or by the use of a separate motor acting through reduction gear or by any other known means; in certain cases means for obtaining creeping speeds may be omitted entirely.

It will be apparent that in certain of its aspects, my invention is not necessarily limited to an arrangement in which the motor speed is varied by shifting the brushes thereof, but is also applicable to the control of other means whereby the speed regulation is effected.

What we claim as new and desire to secure by Letters Patent of the United States is:—

1. In combination in a system of motor control, an electric motor provided with brushes arranged to be shifted to effect speed variation, means for controlling the connection of said motor to a source of supply, means automatically operated in response to a variation in a predetermined relation between the speed of said motor and a fixed speed for automatically shifting the said brushes to maintain said relation, and means set in operation in response to the disconnection of said motor from said source for rendering said first means ineffective and for adjusting said brushes to a relatively low speed position preparatory to the subsequent connection of said motor to said source.

2. In combination in a system of motor control, a motor having brushes arranged to be shifted to vary the motor speed, means for automatically shifting the said brushes to preserve a predetermined relation between the speed of said motor and a fixed speed, a source of supply, and means set in operation upon the disconnection of said motor from said source for automatically shifting said brushes to a minimum speed position preparatory to a subsequent connection of said motor to said source and for automatically returning said brushes to the position they had at the time of the disconnection of said motor from said source preparatory to rendering the said first mentioned means effective.

3. In combination in a system of motor control, a motor, a source of supply, switch mechanism for controlling the connection of said motor to said source, speed regulating means including cooperating relatively movable elements for automatically maintaining a predetermined relation between the motor speed and a fixed speed, and means set in operation upon the disconnection of said motor from said source for controlling said first mentioned means to effect reduced speed starting of said motor when the motor is subsequently reconnected to said source and for gradually returning said elements to their relative positions at the time of the disconnection of said motor from said source prior to rendering said first mentioned means operative to maintain said predetermined speed relation.

4. In combination in a system of motor control, a motor, switch mechanism for controlling the connection of said motor to said source, a speed regulating controller for said motor and having cooperating relatively movable elements, means governed responsively to the relation between the speed of said motor and a fixed speed for effecting relative movement of said elements to automatically maintain the said speed relation, and means set in operation responsively to the disconnection of said motor from said source for rendering inoperative said first mentioned means and for operating said controller to a reduced speed position preparatory to the subsequent reconnection of said motor to said source and for restoring said elements to their relative positions at the time of the disconnection of said motor from said source prior to rendering said first mentioned means operative when the motor is reconnected to said source.

5. In combination in a system of motor control, a controlled motor, a source of supply, switch mechanism for controlling the connection of said motor to said source, a speed regulating controller having cooperating relatively movable elements, means operated responsively to a departure from a predetermined relation between the speed of said motor and a fixed speed for automatically governing said controller to maintain said speed relation, a pilot motor, and means including electrical connections through which when the controlled motor is disconnected from said source said first mentioned means is rendered ineffective and said pilot motor is energized to operate said controller to establish a reduced speed of the controlled motor preparatory to a reconnection of the controlled motor to the surce and the pilot motor is energized to restore said controller elements to their relative positions at the time of the disconnection of the controlled motor from said source and then render said first mentioned means operative when the controlled motor is reconnected to the source.

In witness whereof, we have hereunto set our hands this twenty-third day of March, 1927.

RALPH D. GIVEN.
WILLIAM J. POOL.